United States Patent [19]

Batigne et al.

[11] 4,396,572
[45] Aug. 2, 1983

[54] SUPPORT FOR POROUS BARRIERS MADE OF BAKED CERAMIC MATERIAL

[75] Inventors: Jean Batigne, Enghien; Jean Charpin; Rodolphe Davydoff, both of Paris; François Erhart, Cachan; Pierre Plurien, Palaiseau, all of France

[73] Assignee: Commissariat a l'Energie Atomique, Paris, France

[21] Appl. No.: 403,988

[22] Filed: Oct. 5, 1973

Related U.S. Application Data

[62] Division of Ser. No. 229,221, Feb. 24, 1972, abandoned.

[30] Foreign Application Priority Data

Feb. 24, 1971 [FR] France .............................. 71 06246

[51] Int. Cl.$^3$ ............................................. B29D 9/04
[52] U.S. Cl. ..................................... 264/510; 264/60; 264/514; 264/515; 264/102; 264/141; 264/176 R; 264/209.1; 264/DIG. 48; 264/244
[58] Field of Search ................. 264/60, 510, 514, 515, 264/102, 141, 176 R, 209, DIG. 48; 427/244

[56] References Cited

U.S. PATENT DOCUMENTS 3,203,086  8/1965  Eyraud et al. .................... 117/98 X
3,238,056  3/1966  Pall et al. .......................... 117/99 X Primary Examiner—Stephen J. Lechert, Jr.
Attorney, Agent, or Firm—Kerkam, Stowell, Kondracki & Clarke

[57] ABSTRACT

The invention relates to a support for a ceramic porous barrier of the kind used for obtaining a concentration of uranium 235 in uranium hexafluoride by ultrafiltration. The support is formed by superposing a number of layers in the form of pastes, the particle size being homogeneous and constant in each layer and decreasing from the outer towards the inner layers. The pastes are prepared from powdered materials such as metals, oxides, silicates, borides, nitrides and halides to which mineral binders are added. The pastes are simultaneously extruded or co-extruded after which the resulting support is baked.

9 Claims, 6 Drawing Figures

SUPPORT FOR POROUS BARRIERS MADE OF BAKED CERAMIC MATERIAL

This is a division, of application Ser. No. 229,221, filed Feb. 24, 1972 now abandoned.

The invention relates to a support for a ceramic porous barrier and to a method of preparing the support.

The invention relates more particularly to supports for porous barriers of the kind used e.g. for obtaining a concentration of uranium 235 in uranium hexafluoride by ultrafiltration. At present, the concentration is obtained by making use of the difference in the diffusion rate of uranium 235 hexafluoride and uranium 238 hexafluoride through porous-wall devices conventionally called "porous barriers". These porous barriers usually comprise a porous support and a microporous diffusing layer which separates the isotopes by ultrafiltration, the support proper having a mainly mechanical function of supporting the barrier in the assembly of which it forms a part. In the aforementioned method, however, it is very difficult to obtain adequate porous barriers. The barriers need to have a number of exact and sometimes contradictory characteristics, relating e.g. to the particle size, permeability, mechanical rigidity, surface state, resistance to chemical attack, etc. More particularly, a porous barrier should be sufficiently permeable to allow the maximum possible flow rate while ensuring efficient operation. To this end it should be as thin as possible but should have sufficient mechanical strength and solidity to be handled and transported under acceptable conditions.

The invention aims mainly to provide porous barriers of the aforementioned kind which meet practical requirements better than conventional barriers in that they can be used to provide a porous barrier support upon which a microporous layer meeting the aforementioned different requirements is deposited.

The invention relates mainly to a ceramic porous barrier support, preferably baked in the form of a cylindrical tube and characterised in that it is formed by superposing a number of layers, each of which has particular characteristics, the particle size being homogeneous and constant in each layer and decreasing from the outer towards the inner layers.

The invention also relates to a method of preparing the aforementioned support, starting from powdered mineral or inorganic materials such as metals, oxides, silicates, borides, nitrides, halides or mixtures thereof, adding mineral binders such as clay, kaolin, inorganic gel or organic binders in order to obtain pastes, each paste corresponding to a future layer and having a composition, particle size and properties adapted to the function of the desired layer, after which the pastes are disposed in a corresponding number of superposed layers and then simultaneously extruded or co-extruded, after which the resulting products are baked.

The preferred method according to the invention may also include onr or more of the following additional steps:

The pastes may be mixed and de-aerated, more than once if necessary, before the extrusion or co-extrusion operations.

The superposed layers may be roughly welded together before the extrusion or co-extrusion operation.

The aforementioned de-aeration operations may be performed by forcing the pastes via a helix through a grid and by taking up the finely-divided pastes in another grid and forcing them through a large spinneret, all the aforementioned operations being performed in vacuo.

The products obtained by extrusion or co-extrusion may be received on plaster cradles, dried, cut, and deposited on a bed of electro-melted alumina disposed at the bottom of a sagger, after which electro-melted alumina is poured between the products up to but no higher than their upper level and the assembly is placed in an oven for first baking, after which the products are baked in conventional manner and tested.

The products obtained are tested in the conventional manner and a statistical test by bulloscopy is also made in order to detect any crazing of the outer layer. The invention also relates to all products such as tubular or non-tubular ceramic porous barrier supports in accordance with the definition of the invention, whether prepared by the method according to the invention or not.

The invention will be more clearly understood from the following description which is given by way of example with reference to the accompanying drawings.

Figure 1:
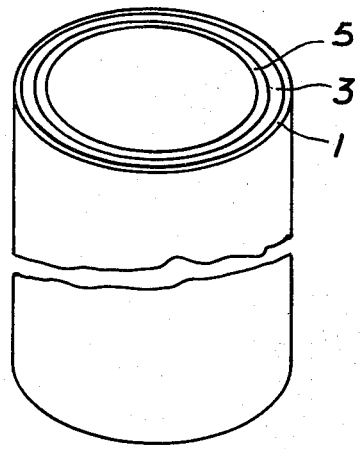
FIG. 1 is a diagrammatic perspective view of a porous barrier tubular support according to the invention.

FIG. 1 shows a porous barrier support according to the invention comprising two concentric layers 1 and 3, the outer layer 1 having a particle size corresponding to a number 20 Tyler standard screen giving a pore radius of $15\mu$, whereas the inner layer 3 has a smaller particle size corresponding to a number 400 Tyler standard screen, giving a particle size of $4\mu$. The thin inner layer 5, which is microporous and diffusing, is deposited by gaseous suspension or filtration on the support, which comprises layers 1 and 3, the total assembly forming the porous barrier.

The aforementioned feature has numerous advantages. Firstly, particles of unduly varying sizes are not mixed since, if such is the case, fine particles settle between large particles and form a cement which stops up the interstices and unacceptably reduces the area across which gas can flow, whereas a wall of uniform particle size has a constant transparency to gas independently of the particle size. (By transparency, we mean the ratio of the surface across which gas can flow to the total surface). Secondly, the increasing smallness of the particles in the layers ensures that gas coming from the exterior is divided progressively more finely.

Furthermore, the very small particles of the inner layer 3 ensure that the inner wall has an excellent surface state, so that the last, extremely thin microporous diffusing layer 5 can be deposited thereon by suspension or filtration.

The final product, therefore, has overall characteristics which are completely new, because they are obtained by adding the individual characteristics of each layer, which can easily be varied.

According to one of the main features of the invention, the multilayer support is obtained by simultaneous extrusion or co-extrusion of laminated structures obtained from pulverulent materials.

Figure 2:
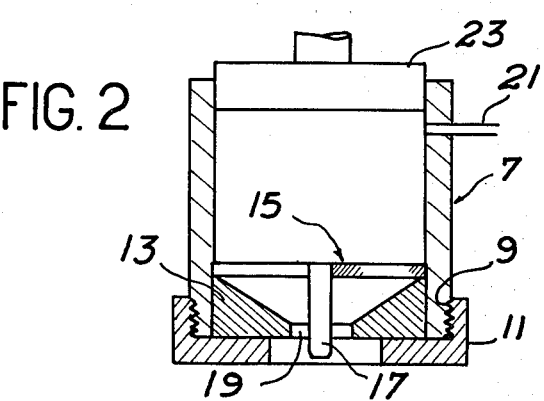
FIG. 2 is a view in section of an extrusion press for working the method according to the invention.

FIG. 2 diagrammatically shows an extrusion press which may be suitable for the aforementioned purpose. The press comprises a cylinder 7 having a thread 9 on which a nut 11 is screwed and holds a nozzle 13. A grid 15, perforated in order to allow material to pass through it, bears a mandrel 17 which, in co-operation with nozzle 13, defines an annular extrusion orifice 19. A pipe 21 connects the interior of cylinder 7 to a vacuum pump, and a piston 23 can drive the material into cylinder 7.

For example, a three-layer support can be prepared as follows: In a preliminary operation, concentrically-disposed blanks are prepared from substances which we shall call A, B, C having properties A', B', C' respectively. The three blanks A, B, C are inserted into one another and the assembly is disposed in cylinder 7, piston 23 being slightly inserted. A vacuum is produced via pipe 21, after which force is exerted on piston 23, thus extruding the coaxial blanks A, B, C through the annular orifice 19.

Clearly, the method according to the invention is independent of e.g. the construction of the press and the manner in which the mandrel is secured, or the number of concentric layers of different materials. It is merely necessary, before the article is finally extruded, to prepare a number of blanks of appropriate inner and outer diameter, equal to the desired number of layers of different materials.

The invention, which mainly relates to the simultaneous extrusion of a number of pre-formed blanks disposed inside an extrusion press, is of course independent of the shape of the extrusion nozzle 13, which can be annular, circular or of any geometrical shape. If nozzle 13 is rectangular, laminated strips can be extruded by disposing different blanks of rectangular cross-section side by side in the extrusion press. Alternatively, laminated strips can be formed by extruding polygenal tubes split along their edges after extrusion.

Of course, the manner of preparing the blanks and the concentric arrangement thereof is important for working the method according to the invention and the construction of porous barrier supports having the desired characteristics, and will therefore be described hereinafter in the present description, the aim of which is to illustrate all the operations required for obtaining a porous support having two concentric layers.

In practice, the desired result according to the invention is obtained by filling the frame of extrusion presses with concentric cylinders of paste. For example, in the case of supports comprising two layers, the rough-texture paste is disposed in the peripheral portion and the cylinder of fine paste is disposed at the centre. The preparation of the pastes is a delicate operation. Two-layer supports are prepared as described hereinafter.

After mixing, the pastes are de-aerated for the first time in machines designed as follows: A helix forces the paste through a grid. The resulting finely-divided paste is taken up in another helix and forced through a large spinneret. All the aforementioned operations are performed in vacuo, giving a very compact, de-aerated cylinder.

The cylinders of de-aerated paste are introduced into further de-aerating machines operating in the same manner as before. One of the aformentioned machines is charged with paste for filling the outer part of the frame of the piston extruder. The other machine processes the inner paste in order to form the centre cylinder.

Figure 3:
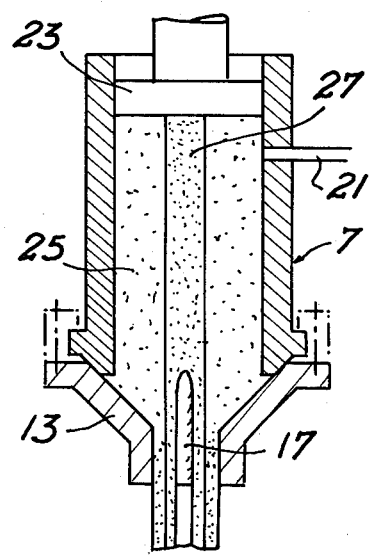
FIG. 3 is a view in section of an alternative embodiment of the extrusion press shown in FIG. 2.

In short, the final extrusion operation according to the invention is performed in the body of an extrusion press comprising a cylinder 7 and piston 23 as shown in FIG. 3. The press body must be filled with a hollow cylinder 25 made of the outer paste and a central, solid cylinder 27 made of the inner paste. A vacuum must be produced between the two pastes in order to ensure that they adhere perfectly and in order to prevent air holes at their contact curface.

Figures 4, 5:
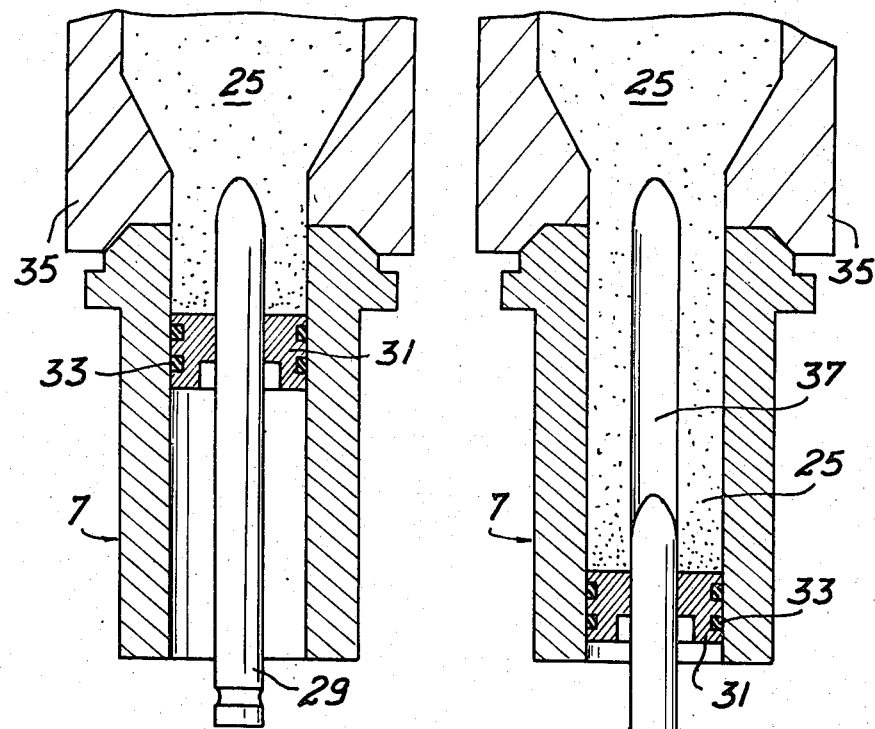
FIGS. 4 and 5 are views in section of a device for preparing superposed layers, at two successive stages in the preparation.
Figure 6:
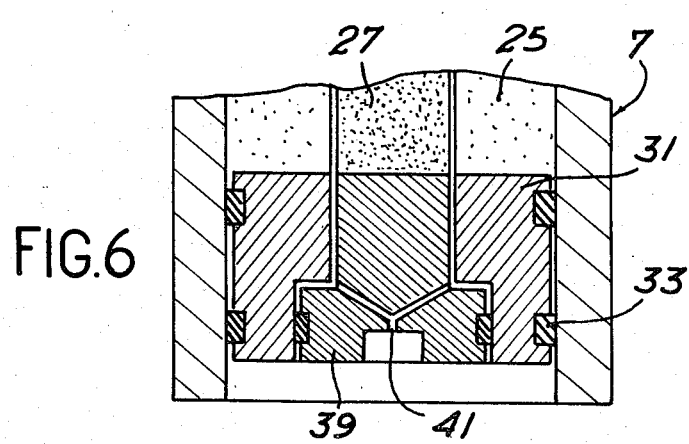
FIG. 6 is a view in section of the bottom part of FIGS. 4 and 5, during a third and subsequent stage of the preparation.

In practice the last-mentioned result is obtained as follows. The outer part is filled by disposing a rod 29 in the body 7 (FIG. 4), the rod being centered by a hollow piston 31 provided with gaskets such as 33. The other end of rod 29 is centered and held by an outer device, not shown. The body 7 is pressed in sealing-tight manner against the end 35 of the extrusion nozzle of the second de-aerating device (not shown) mentioned hereinbefore. The extruder associated with the de-aerating device is started up and the paste 25 is driven out, fills body 8 and drives out piston 31. Piston 29 is then withdrawn, leaving piston 31 in position (FIG. 5). The inner cylinder 27 is extruded on another machine and placed in the hole 37 left free after piston 29 has been withdrawn. At this point, the body 7 is released from the end 35 by cutting paste 25, and the two cylinders 25 and 27 are roughly welded together at their free ends. Next, the central piston 39 is placed in position (FIG. 6) in the hollow piston 31. Through orifice 41 of the piston 39, a vacuum is made between the two pastes, whereupon the body 7 is ready for the final extrusion. The body 7 is upturned and placed on the extruder (FIG. 3); nozzle 13 is secured and extrusion begins, piston 23 exerting pressure on the assembly formed by pistons 31 and 39. When body 7 is emptied, piston 39 is withdrawn and piston 29 is re-inserted and the operation can begin again.

The resulting tubes are received on plaster cradles, washed, dried, and placed in a furnace for first baking. The latter operation differs from the method of first-baking homogeneous tubes, which causes cracks. The co-extruded tubes are disposed on a bed of very coarse electro-melted alumina (particle size approx. 1/10 mm) disposed at the bottom of a sagger. The particles are poured between the tubes up to but not above their top level. After the first baking, the tubes are baked in conventional manner and tested. A statistical test by bulloscopy may be added to the conventional test, in order to detect any crazing of the inner layer.

We claim:

1. A method of preparing a support for porous barriers including the steps of preparing various pastes, each paste corresponding to a future layer and having a composition, a particle size and properties appropriate to the layer, then disposing the paste in the corresponding number of superposed layers then extruding simultaneously a support and then baking the support.

2. A method according to claim 1, including the step of preparing the pastes from powdered materials selected from the group consisting of metals, oxides, silicates, borides, nitrides and halides, to which binders are added.

3. A method according to claim 2, the binders being mineral and selected from the group consisting of clay, kaolin and inorganic gels.

4. A method according to claim 2, the binders being organic.

5. A method according to claim 1, including the step of mixing and de-aerating the pastes before the extrusion step.

6. A method according to claim 1, including the step of roughly welding the superposed layers together before the extrusion or co-extrusion step.

7. A method according to claim 5, said de-aeration step being performed by forcing the pastes through a helix and through a grid and by taking up the finely-divided pastes in another grid and forcing them through a large spinneret, said steps being performed in vacuo.

8. A method according to claim 1, including the steps of receiving the products obtained by extrusion on plaster cradles, then dried, then cut, and then deposited on a bed of electroc-melted alumina disposed at the bottom of a sagger, then pouring electro-melted alumina between the products up to but no higher than their upper level and then placing the assembly in an oven for first baking, and then baking the products in conventional manner.

9. A method according to claim 8, wherein a statistical test by bulloscopy is made in order to detect any crazing of the outer layer.

* * * * *